(12) United States Patent
Carrington

(10) Patent No.: US 9,455,663 B1
(45) Date of Patent: Sep. 27, 2016

(54) MODULAR SOLAR PANEL ROOF SYSTEM

(71) Applicant: Scott Carrington, Calgary (CA)

(72) Inventor: Scott Carrington, Calgary (CA)

(*) Notice: Subject to any disclaimer, the term of this patent is extended or adjusted under 35 U.S.C. 154(b) by 0 days.

(21) Appl. No.: 14/725,061

(22) Filed: May 29, 2015

(51) Int. Cl.
| | |
|---|---|
| *H02S 20/25* | (2014.01) |
| *H02S 40/36* | (2014.01) |
| *H02S 40/32* | (2014.01) |
| *H02S 30/10* | (2014.01) |
| *H02S 50/10* | (2014.01) |

(52) U.S. Cl.
CPC ............. *H02S 20/25* (2014.12); *H02S 30/10* (2014.12); *H02S 40/32* (2014.12); *H02S 40/36* (2014.12); *H02S 50/10* (2014.12)

(58) Field of Classification Search
CPC ........ H02S 20/23; H02S 20/25; H02S 30/10; H02S 40/32; H02S 40/36; H02S 50/10
See application file for complete search history.

(56) References Cited

U.S. PATENT DOCUMENTS

| | | | | |
|---|---|---|---|---|
| 4,311,869 | A * | 1/1982 | Kurth | H01L 31/0236 136/246 |
| 6,606,823 | B1 | 8/2003 | McDonough | |
| 7,012,188 | B2 | 3/2006 | Erling | |
| 7,487,771 | B1 | 2/2009 | Eiffert | |
| 7,709,735 | B2 * | 5/2010 | Vigorito | H02G 3/081 174/53 |
| 8,656,660 | B2 * | 2/2014 | Danning | F24J 2/5237 52/173.3 |
| 8,713,861 | B2 | 5/2014 | Desloover | |
| 2005/0225947 | A1 * | 10/2005 | Araujo | H05K 5/0008 361/719 |
| 2009/0215304 | A1 | 8/2009 | Faust et al. | |
| 2011/0005567 | A1 | 1/2011 | VanderSluis et al. | |
| 2011/0036386 | A1 * | 2/2011 | Browder | H02S 40/32 136/244 |
| 2011/0162638 | A1 | 7/2011 | Heidtmann | |
| 2012/0024563 | A1 * | 2/2012 | Korman | H02S 20/00 174/51 |
| 2012/0272592 | A1 | 11/2012 | Bellavia | |
| 2014/0090697 | A1 * | 4/2014 | Rodrigues | H02S 20/23 136/251 |
| 2014/0230877 | A1 | 8/2014 | Goldberg et al. | |

FOREIGN PATENT DOCUMENTS

| | | |
|---|---|---|
| CA | 2249350 | 4/1997 |
| CN | 201952995 | 8/2011 |
| DE | 4343514 | 12/1993 |
| DE | 19704255 | 2/1997 |
| EP | 2333450 | 6/2011 |
| EP | 2704210 | 3/2014 |

* cited by examiner

*Primary Examiner* — Patrick Maestri
(74) *Attorney, Agent, or Firm* — Richard D. Okimaw

(57) ABSTRACT

A modular solar panel roof system comprising a plurality of interconnected square-shaped modular tiles. Each modular tile comprises a circular AC solar cell on an outward facing surface of the modular tile and a housing with an outward facing surface designed to support the weight of a human without breaking. Contours located on at least two sides of the modular tile are designed to mate with identical contours on an adjacent modular tile so as to define a water tight seal between the modular tiles. Electrical terminals located on at least two sides of the modular tile are conductively coupled with the AC solar cell in the modular tile. The electrical terminals are designed to mate with identical electrical terminals on an adjacent modular tile.

18 Claims, 6 Drawing Sheets

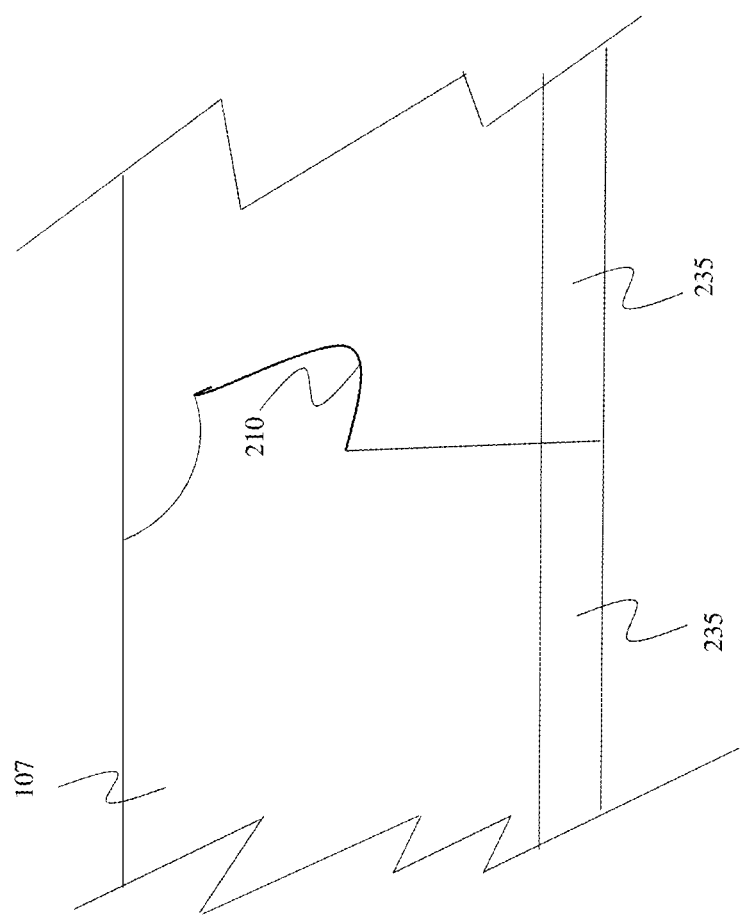

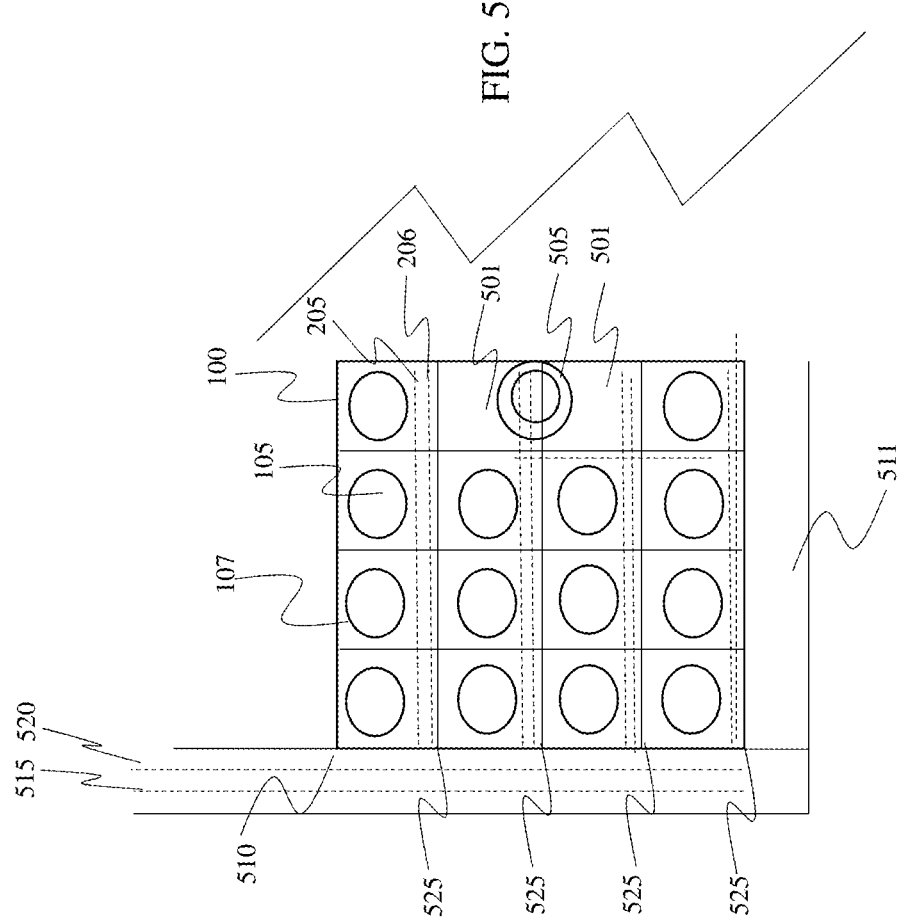

MODULAR SOLAR PANEL ROOF SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to the field of power generation from solar energy, and more specifically to the field of systems for generating electrical power from solar energy configured to be affixed to a roof or wall.

BACKGROUND

As the world's population increases, the demand for energy has increased. Given that fossil fuels are a limited resource, businesses and individuals alike have increasingly turned to solar energy as a means for providing usable power. Solar roof panels have been used on roofs in the past in order to harness solar energy. These devices, however, struggle to become commercially successful.

Currently, solar panels consist of large, heavy and odd-sized items that are problematic to handle and install. The large size of a conventional solar panel makes it difficult to install, maintain and replace, as well as clean and move around. Because of the large size of conventional solar panels, the labor costs required to install and remove them are increased. Additionally, some conventional solar panels can be easily broken when a user walks on the panels. Another known problem with some conventional solar panels is that a flat roof is preferred. This requirement results in many residential roofs being unable to house a conventional solar panel, which limits the available solar panel options to the consumer.

Like any other industry, the solar panel industry and solar cell technology are constantly evolving. Because of the constant evolution of solar cell technology, the current solar cell and solar cell technology will eventually become obsolete when new solar cell technology become commercially available. As a result of this constant evolution, another problem with the large and bulky conventional solar panels is that as technology evolves, the entire conventional solar panels may need to be replaced if a consumer desires to upgrade to a more efficient solar cell. Again, this increases labor and installation costs.

An additional concern with conventional solar panel technology is that solar panels currently do not maximize use of roof space. Typically, solar panels are sold in a single large unit and cannot be adapted to each specific roof on which it is installed. As a result, much of the usable space on top of a roof goes unused, which is inefficient when trying to maximize the amount of solar energy that is to be harnessed.

A further problem with conventional solar panel technology is that today's solar panels must be engineered to be placed in the most efficient location on the roof. As briefly mentioned above, not all roofs are fit for a conventional solar panel. Physical measurements must be taken to account for the tilt and azimuth of the solar panel and how they relate to the position of the sun, in order to increase their efficiency. Also, shadowing conditions on the roof must be taken into account, since shadows on the solar panels decrease the efficiency of a solar panel.

As a result, there exists a need for improvements over the prior art and more particularly for a more efficient way of harnessing solar energy using solar cells.

SUMMARY

A modular solar roof system comprising a plurality of interconnected square-shaped modular tiles is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, the modular solar roof system includes a planarity of interconnected square shaped modular tiles. Each modular tile comprises a circular AC solar cell on an outward facing surface of the modular tile and a housing with an outward facing surface designed to support the weight of a human without breaking. Contours located on at least two sides of the modular tile are designed to mate with identical contours on an adjacent modular tile so as to define a water tight seal between the modular tiles. Electrical terminals located on at least two sides of the modular tile are conductively coupled with the AC solar cell in the modular tile. The electrical terminals are designed to mate with identical electrical terminals on an adjacent modular tile.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 3C is an illustration of a side view of a pair of joined tiles having a downward force applied on it, according to an example embodiment;

FIG. 5 is an illustration of a top view of a portion of the modular solar panel system, according to an example embodiment.

DETAILED DESCRIPTION

Figure 1:
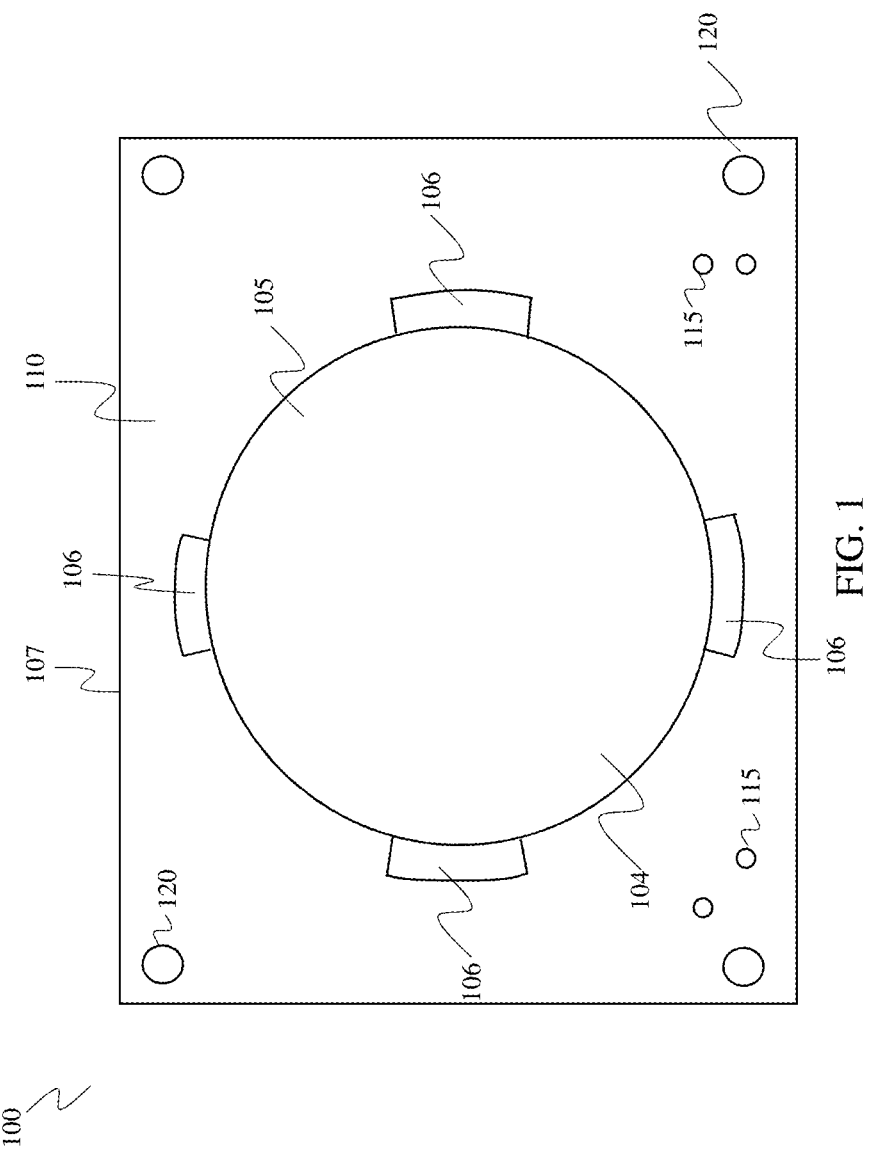
FIG. 1 is an illustration of a top view of a modular tile of a modular solar panel roof system, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a modular solar panel system consisting of small interconnected tiles, such that the system can be more easily installed on roofs having a variety of different sizes and shapes, thereby reducing costs. Another improvement of the disclosed embodiments is that the system has removable circular AC solar cells that can be upgraded as technology evolves. Said upgrades would be accomplished in order to gain greater efficiency of the system. A further improvement of the disclosed embodiments is that the system provides a micro-inverter on each modular tile, thereby eliminating the need for the solar panel location to be engineered. Another improvement of the disclosed embodiments is that the modular features of the system allow substantially more usable area of a roof to be covered, thereby increasing the amount of solar energy that may be harnessed from a roof. Also, the modular tile includes the wiring inside of the housing, which can be installed offsite (during the manufacturing process), thereby allowing the system to be quickly assembled on-site thereby reducing on-site installation time. Another improvement over the prior art is that the modular tiles are designed to provide a water-tight seal and support the weight of a human, thereby increasing its life span and its durability. Another substantial improvement is the material used in the square modular tile is UV resistant, which means the tile material will not degrade in the sun over time. Therefore, once the disclosed tiles are installed, the tiles will not have to be replaced every 10-15 years like a conventional asphalt roof. The disclosed tiles will last for an undetermined amount of time without the need for replacement—speculatively 50-80+ years. This feature would save the homeowner substantial money in roof replacement costs over the longevity of the home.

Referring now to the Figures, FIG. 1 is an illustration of a top view of a modular tile 100 of a modular solar panel roof system, according to an example embodiment. FIG. 1 illustrates one of the plurality of interconnected square shaped modular tiles. The modular system comprises a plurality of these interconnected square shaped modular tiles conductively coupled together forming an electrical circuit. Each of the square shaped tiles include a housing 107 with an outward facing surface 110. The housing may be made of material such as metal, wood, ceramic, polymer, etc. and such material should be designed to support the weight of a human without breaking. The outward facing surface of the housing may be comprised of, or lined with, material having UV resistant properties so that the elements to not wear the outward facing material of the tile. UV resistant properties include the ability to expand, the ability to easily replace said item and the ability to last longer in typical lighting or sun conditions of the environment. The housing has an opening 104 on the top surface that defines a cavity inside the housing that is adapted for receiving the solar cell. The housing may include screw holes or holes 120 proximate to the corner of each tile such that each tile may be secured of affixed onto the roof of a house by a fastener. In the present embodiment, each hole comprises a circular opening and is adapted such that a fastener can pass through the body of the housing so that the fastener may be secured to the roof of a structure, or said fasteners may be present on the housing at the time of installation. In one embodiment, each hole may have a threaded wall so that a roofing screw with threads that match the threaded wall such that the screw can be used to attach the housing of the tile to a roof.

The housing may also include a plurality of boreholes 115. Each of the boreholes are positioned on the outward facing surface of the tile directly above the location of a conductor encased within the housing. Each conductor is conductively coupled to the solar cell's electrical terminals (explained below) and with the solar cell. Each of the boreholes provides access from the outside to the conductor encased within the housing of the tile. The tile can also include a rubber plug that seals each borehole so that the inside of the housing is not exposed to the outside elements. In one embodiment, each plug may be comprised of rubber material. Each plug may be removable so that a user can remove the plug in order to test the conductivity of each conductor. In other embodiments, each plug may be comprised of material having perforate-able properties or that can be pierced by a technician in order for the technician to test electrical components of the tile.

The housing may also include a plurality of tabs 106 along the edge of the opening 104. Such tabs can be used as a system allowing the solar cell to be removed (further explained in FIG. 4).

A circular AC solar cell 105 is positioned on the outward facing surface of the modular tile and is received by the opening on the outward surface. The solar cell may be an aftermarket service solar cell specifically engineered for an individual building or it may be a commonly used solar cell such as a solar cell made of crystalline silicon, which is well known to those skilled in the art. The AC solar cell is conductively coupled to electrical terminals (illustrated in FIGS. 2, 4 and 5) on at least two sides of the outside surface of the housing by conductors (illustrated in FIGS. 2, 4 and 5), wherein each electrical terminal is designed to mate with identical at terminals of an adjacent modular tile. The solar cell may be removable from the housing. In one embodiment, the solar cell comprises a circular shape solar cell. The solar cell is adapted to fit into an opening on the outward facing surface of the housing.

Figure 2:
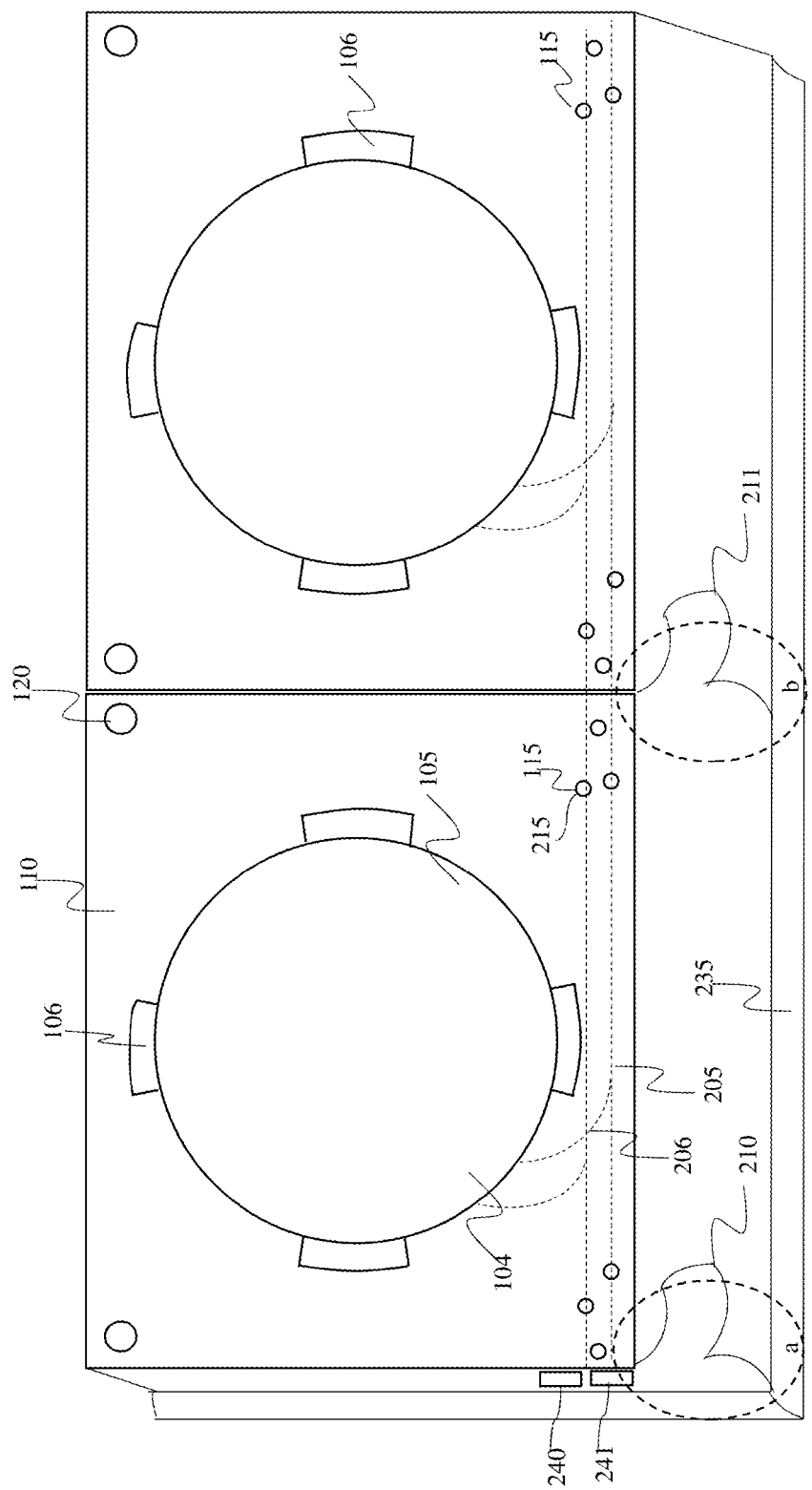
FIG. 2 is an illustration of a perspective view of two titles of the system jointed together, according to an example embodiment.

FIG. 2 is an illustration of a perspective view of two titles of the system jointed together, according to an example embodiment. In the present embodiment, each of the tiles are square shaped. However, in other embodiments other shapes may be used, such as a rectangular shaped tile. Each of the opposing sides of the tile have contours 210. The contours are designed to mate with identical contours on the sides on the adjacent tile so as to define a watertight seal between the modular tiles. In the present embodiment, contour 211 should be positioned such that the contour faces the lower elevation of a sloped roof so that gravity further assists in joining the tiles. Additionally, the surfaces of the sides of each tile may also include seals for further creating a watertight seal. In one embodiment, the contour may be a tongue and groove type contour. In the present embodiment, the contours have a somewhat petal shape. However, other shapes and sizes may also be used in order to join adjacent tiles with each other.

FIG. 2 also illustrates conductors 205, 206 (represented by a dashed line) encased within the housing that span from a first side of the housing to a second side of the housing. The conductors are conductively coupled to the AC solar cell and to the electrical terminals 240 on at least two opposing sides of the modular tile.

Each of the electrical terminals is adapted to mate with identical terminals on an adjacent tile. In one embodiment, the electrical terminals includes at least two pins for proper conductive coupling of adjacent tiles (similar to how a cellular telephone battery is coupled to the body of a cellular telephone). The use of electrical terminals to connect modular components is well known to those skilled in the art. The terminals may comprise conductive material having a portion for contact with a matching contact.

FIG. 2 also illustrates the boreholes 115 positioned over conductors 205, 206 such that a user can have access to test each of the conductors. In the present embodiment, a plug 215 is inserted into each of the bores of the housing. Each of the plugs may be comprised of material, such as rubber, that can be punctured to provide access to the user. In other embodiments the plugs may be removable.

A gasket 235 is affixed to an inward facing surface or surface of the housing opposing the outward facing surface of the housing. In one embodiment the gasket comprises rubber material and is affixed to the inward facing surface of the tile with glue. The gasket is designed such that when downward would forces act on the gasket, the gasket presses against the gasket of an adjacent modular tile and a watertight seal is formed. The gasket may comprise various thicknesses depending on the application desired by the user.

Figure 3A:
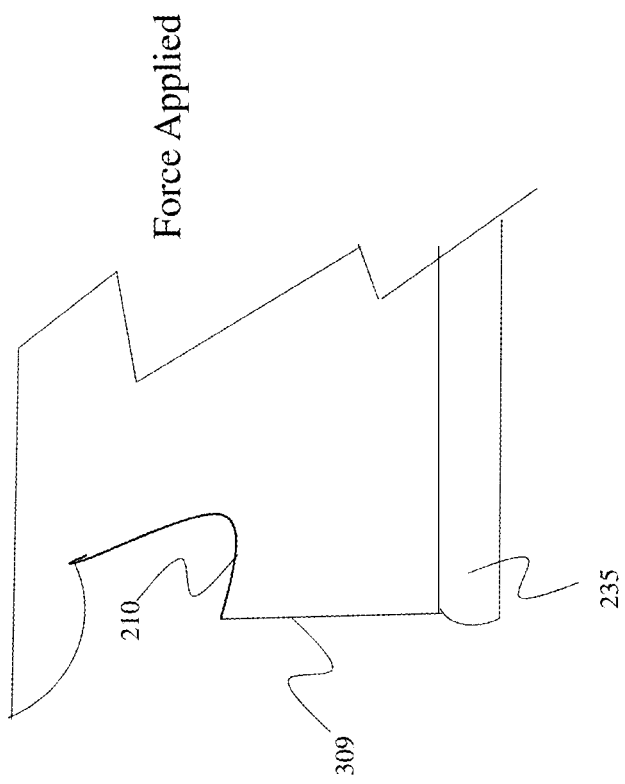
FIG. 3A is an illustration of a side view of a portion of a tile of the system, according to an example embodiment.

FIG. 3A is an illustration of a side view of a portion of a tile of the system, according to an example embodiment. FIG. 3A is a side view of the portion of the tile taken along the Circle a shown in FIG. 2. The housing 107 has a gasket 235 affixed to the inward facing surface of the housing. FIG. 3A has no downward force applied to it.

Figure 3B:
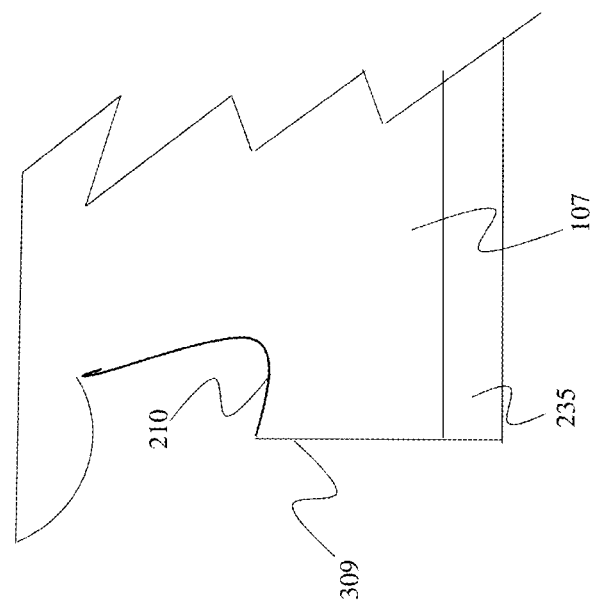
FIG. 3B is an illustration of a side view of a portion of a tile having a downward force applied on it, according to an example embodiment.

FIG. 3B is an illustration of a side view of a portion of a tile having a downward force applied on it, according to an example embodiment. FIG. 3B is a side view of a portion of the tile taken along the Circle a shown in FIG. 2 having downward force acting upon the tile. A downward force acts upon the housing of the tile and compresses the rubber gaskets forcing the body of the gasket to extend beyond the side 309 of the housing.

FIG. 3C is an illustration of a side view of a pair of joined tiles having a downward force applied on it, according to an example embodiment. FIG. 3B is a side view of a portion of the tile taken along the Circle b shown in FIG. 2 having downward force acting upon the tile. When the downward force acts upon the joined tiles, the downward force causes the rubber gasket of each tile to press against the adjacent tile forming a watertight seal. Additionally, each of the opposing sides of each tile may comprise a seal material to further increase the watertight seal of the system. Note also that there is some overlap between the top of one tile and the bottom of the adjacent connect tile, which results in water (from precipitation, such as rain) running off the tiles and off the roof, instead of working its way in between the tiles.

Figure 4:
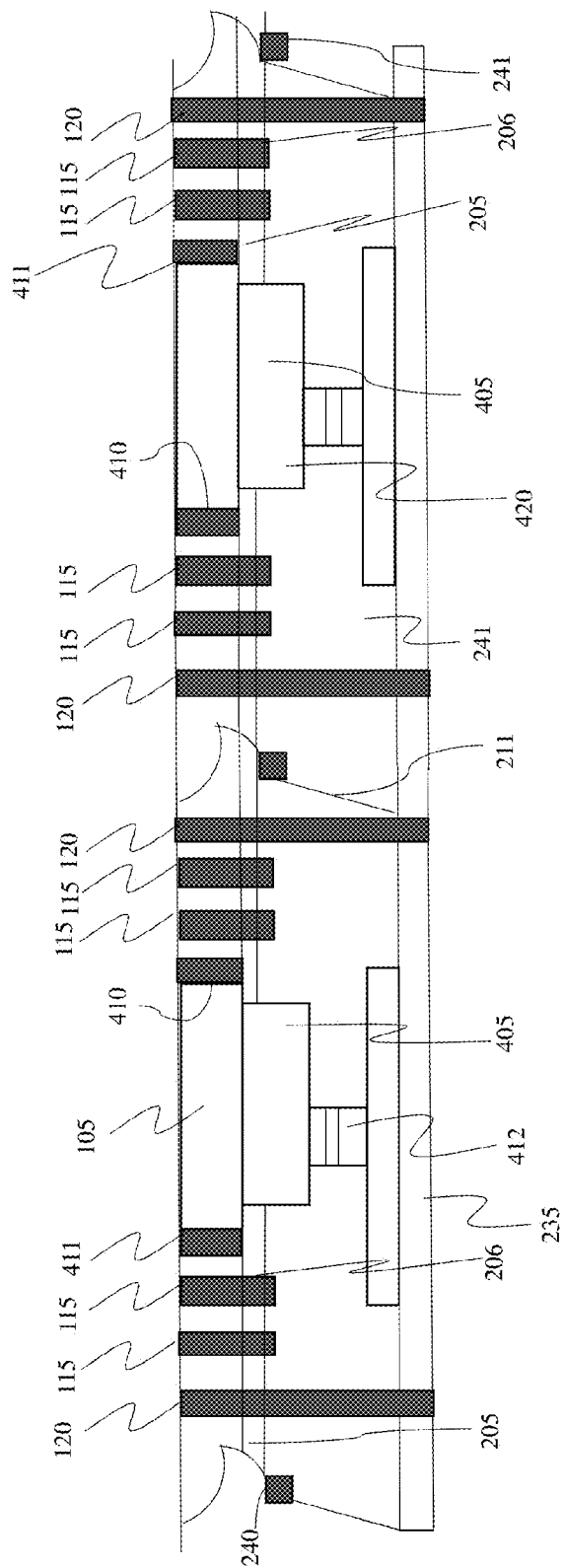
FIG. 4 is an illustration of a cross sectional side view of a pair of joined tiles, according to an example embodiment.

FIG. 4 is an illustration of a cross sectional side view of a pair of joined tiles, according to an example embodiment. FIG. 4 illustrates the pair of adjacent tiles having their matching contours joined. In the present embodiment, an inverter or micro-inverter 405, 420 conductively coupled to the solar cell 105 converts the DC current from the solar cell to AC current. The inverter and solar cell are conductively coupled by conductors 205, 206 that span from one side of the housing to the opposing side of the housing and are coupled to terminals 240 and 241. The housing has a cavity that is adapted for insertion of the solar cell and inverter. The conductors and terminals of each tile allow for the individual tiles to be conductively coupled to one another in order to form the modular solar panel system. FIG. 4 also illustrates holes 120 through which fasteners may be used to fasten a tile to a roof. In other embodiments (not shown), each hole may have a threaded wall that matches the threads of a roofing screw or nail and/or the hole is slightly smaller for a water tight solution. Boreholes 115 within the housing are positioned so that a user can have access to conductors 205, 206 that are encased within the housing. In one embodiment, (not shown), the conductors may be housed in a conduit within the body of the housing. The conductors may be insulated wiring and are well known to those skilled in the art. In this embodiment, an AC solar cell refers to a solar cell that includes said inverter with the cell.

The solar cell 105 has an outward facing surface and a lower portion 410. The lower portion is adapted to be encased within the housing of the tile. The surfaces of the lower portion of the solar cell may have at least one tab 411. Such tabs can correspond to a plurality of slots 106 (see FIG. 1) along the edge of the opening 104 of the top surface of the housing. The tabs can be sized so that the tabs can pass through the slots and allow the lower portion of the solar cell to enter into the cavity of the housing. Various sizes of slots may be used. A tension spring 412 may inserted into the housing such that the spring provides an upward force that pushes against the inward facing surface of the solar cell or inverter when the lower portion of the solar cell is received by the housing.

To insert a solar cell into the housing of the tile, a user can align the tabs 411 of the lower portion of the solar cell with the slots 106 along the edge of the opening of the housing so that the tabs can pass through the slots. Next, a user can apply downward force to compress the tension spring and allow the tabs to pass by the slots. Next, a user can rotate the solar cell such that the tabs are no longer aligned with the slots. Next the user can remove the downward force, causing the spring to decompress thereby pushing the tabs against an inside surface of the housing that will lock the solar panel in place.

To remove the solar cell from the tile, a user would apply downward force so that the tension spring compresses. Next, while maintaining downward force on the spring, a user would align the tabs with the slots so that the tabs can pass through the slots. Next, the user would remove the downward force thereby allowing the tabs of the solar cell to pass through the slots. In other embodiments, other methods of securing the solar cell to the housing may also be used.

FIG. 5 is an illustration of a top view of a portion of the modular solar panel system, according to an example embodiment. A plurality of modular tiles 100 having a solar cell are joined together and have conductors and a solar cell within each tile conductively coupled to one another. As mentioned above, the electrical terminals located on opposing sides of the modular tile mate with the electrical terminals on an adjacent tile in order to create a segment of the circuit. The electrical terminals 240, 241 on the sides of the tile are designed to also mate with an electrical terminal 525 on a side roof guide rail 510. The roof guide rail has an elongated housing adapted to encase conductors 515, 520, which are conductively coupled to the electrical terminal of the roof guide rail. The bottom roof guide rail 511 is installed at the bottom of the roof and provides a straight surface or edge that enables those tiles installed above it to line up.

One end of each conductor 515, 520 is coupled to the terminal of the roof guide rail and the other end can be attached to a battery or external storage unit or can be coupled to circuitry for providing power to electrical devices and components. At least one side of the roof guide may also include a contour that matches with at least one side of the modular tile so that the tile can be joined to the roof guide rail. As mentioned above, the roof guide rail would be at the lowest elevation of a tilted roof so that gravity may also assist in further joining and providing a water tight seal. Additionally, the surface of the contour of the roof contrail may also be lined with or comprise sealant materials to further facilitate a watertight seal. Note also that the vertical rail may be trimmed to account for the specific roof on which the system is being installed.

The system may also include tiles 501 (which may or may not include conductors) having the solar cell removed from the housing of the tile. Such tiles allow for a user to cut off portions of the housings of a tile to fit around obstacles such as chimneys 505 or other bodies protruding from or lying on the surface of a roof.

Referring now to FIGS. 1-5, in operation, each tile can be manufactured and assembled at an offsite location. The assembling of the tile will include inserting the solar cell 105 into the cavity of the housing 107. The circuitry of the solar cell will be connected to conductors 205, 206. The connections may be made by soldering, crimping, etc. As mentioned above, the housing will also include holes 120 adapted for receiving fasteners for fastening each tile to a roof, or screws may be preinstalled at time of manufacturing. A removable or perforate-able plug can be inserted into the borehole 115 in the housing so that a user can either remove the plug or puncture the plug to test the conductors.

In order to install the system, a side roof guide rail is affixed proximate to an edge of a roof. The roof guide rail should be affixed using fasteners and screws, bolts, etc. The side roof guide rail attaches to the edge of the roof. The side roof guide rail comprises an elongated housing that houses conductors 415, 420. Note that in one embodiment, the roof guide rails is configured and designed such that the rail will not bend in one direction—rather the rail will bend or flex in a first direction but will not bend or flex in a second direction perpendicular to the first direction.

The conductors are connected to a plurality of electrical terminals 525 along the body of the roof guide rail housing. One side of the side roof guide rail comprises a contour that matches the contours of one side of the tiles 211, 210. In order to install the tiles, the side of the tile having a contour designed to match the contour of the side roof guide rail side is positioned such that the contours match and snap into place creating a water tight seal.

As a tile snaps into place onto the side roof guide rail, the electrical terminals 240 of the tiles matches and conductively couples with the electrical terminals of the side roof guide rail. Next, each tile may be affixed to the roof by using roof screws or other fasteners. As downward forces push downward against the housing and gasket, forces push the gasket (having rubber like qualities) outward perpendicular from the downward force thereby forming a watertight seal with the side roof guide rail. The bottom roof guide rail is installed at the bottom of the roof and provides a straight surface or edge that enables those tiles installed above it to line up.

Next, additional tiles can be added in a similar fashion forming electrical circuit. A consumer can install tiles to cover an entire roof, a portion of the roof, or any combination thereof. A user may cut away or remove blank tile in order for the tile to fit around various obstacles, such as chimneys, exhaust fans etc., found on a roof. Additionally, additional wiring may be supplied to the user to adjust the layout of the wiring of the circuit.

In operation, a user may desire to remove one solar cell in order to replace the solar cell or to upgrade solar cell. In one embodiment, to remove the solar cell a user would apply downward force on the solar cell so that the spring 412 inside the housing below the solar cell is compressed. Next, the user would align the tabs 411 on the lower part of the solar cell with the slots 106 on the housing so that the tabs can pass by the slots. Next, the user would remove the downward force thereby allowing the tabs of the solar cell to pass through the slots. After removing the solar cell from the housing the cell would disconnect the solar cell from the conductors. After performing the required maintenance, a user may insert a repaired or new solar cell. To insert a solar cell into the tile, a user can align the tabs along the lower portion of the solar cell with the slots along the edge of the opening of the housing so that the tabs can pass through the slots. Next, a user can apply downward force to compress the tension spring held within the body of the housing and allow the tabs to pass by the slots. Next, a user can rotate the solar cell such that the tabs are no longer aligned with the slots. Next the user can remove the downward force, causing the spring to decompress and thereby unlocking the tabs against an inside surface of the housing.

In operation, to test the conductors 205, 206, a user may remove the rubber plugs 215 from the boreholes in order to check the conductors. In other embodiments, the plugs may be made of material that can be preparation or pierce. In such embodiments the user may use a tool to pierce or perforate the plug in order to test the conductors.

The subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although specific embodiments of the invention have been disclosed, those having ordinary skill in the art will understand that changes can be made to the specific embodiments without departing from the spirit and scope of the disclosed embodiments. The scope of the invention is not to be restricted, therefore, to the specific embodiments. Furthermore, it is intended that the appended claims cover any and all such applications, modifications, and embodiments within the scope of the disclosed embodiments

I claim:

1. A modular solar panel roof system comprising a plurality of interconnected square-shaped modular tiles, each modular tile comprising:

a housing with the outward facing surface designed to support weight without breaking;

a circular opening extending into said outward facing surface;

a circular AC solar cell sized to be received within said circular opening, said AC solar cell having at least one tab adapted to retain said AC solar cell within said circular opening as said AC solar cell is rotated from an insertion orientation to a locked position;

contours located on at least two sides of the modular tile, wherein said contours comprise tongue and groove features extending longitudinally along a length of said at least two sides and are designed to mate with identical contours on an adjacent modular tile, so as to define a water tight seal between said modular tiles; and electrical terminals located on said contours located on said at least two sides of the modular tile, wherein said electrical terminals are conductively coupled with the AC solar cell in said modular tile, and wherein said electrical terminals are designed to mate with identical electrical terminals on an adjacent modular tile;

wherein said plurality of interconnected square-shaped modular tiles are configured for covering an entire roof surface.

2. The system of claim 1, wherein a rubber gasket is affixed to an inward facing surface of the housing opposing the outward facing surface such than when the modular tile is joined with an adjacent modular tile and a downward force is applied, said gasket presses against a gasket of the adjacent modular tile and a water tight seal is formed, wherein said gaskets expand outwards in a lateral direction under compression.

3. The system of claim 1, wherein the housing has a plurality of boreholes on the outward facing surface, wherein each borehole is positioned above a conductor, which conductor conductively couples the AC solar cell to the electrical terminals, wherein each borehole provides access to said conductor, and wherein a rubber plug seals each borehole.

4. The system of claim 3, wherein each plug is removable such that a user can test each conductor.

5. The system of claim 1, wherein the modular tile can be screwed to an outward facing surface of a roof or wall using a plurality of roofing screws.

6. The system of claim 2, wherein the rubber gasket is affixed to said surface of the housing with glue.

7. The system of claim 1, wherein an inverter is affixed to and conductively coupled to a bottom side of the AC solar cell of each tile or is incorporated into the solar cell.

8. The system of claim 1, wherein the electrical terminals located on the least two sides of the modular tile are further designed to mate with an electrical terminal on a roof guide rail.

9. The system of claim 1, wherein the AC solar cell is removable from the outward facing surface of the housing of the modular tile.

10. The system of claim 1, wherein the outward facing surface of the tile comprises material having UV resistant properties.

11. A modular solar panel roof system comprising a plurality of interconnected square-shaped modular tiles, each modular tile comprising:

a housing with the outward facing surface designed to support weight without breaking;

a circular opening extending into said outward facing surface;

a circular AC solar cell sized to be received within said circular opening, said AC solar cell having at least one tab adapted to retain said AC solar cell within said circular opening as said AC solar cell is rotated from an insertion orientation to a locked position;

a rubber gasket affixed to an inward facing surface of the housing opposing the outward facing surface such than when the modular tile is joined with an adjacent modular tile and a downward force is applied, said gasket presses against a gasket of the adjacent modular tile and a water tight seal is formed;

contours located on at least two sides of the modular tile, wherein said contours comprise tongue and groove features extending longitudinally along a length of said at least two sides and are designed to mate with identical contours on an adjacent modular tile, so as to define a water tight seal between said modular tiles;

electrical terminals located on said contours located on said at least two sides of the modular tile, wherein said electrical terminals are conductively coupled with the AC solar cell in said modular tile, and wherein said electrical terminals are designed to mate with identical electrical terminals on an adjacent modular tile;

wherein the housing has a plurality of boreholes on the outward facing surface, wherein each borehole is positioned above a conductor, which conductor conductively couples the AC solar cell to the electrical terminals, wherein each borehole provides access to said conductor, and wherein a rubber plug seals each borehole; and, wherein each plug is comprised of material perforate-able properties such that a user can pierce each plug so that a user can test each conductor.

12. The system of claim 11, wherein each plug is removable such that a user can test each conductor.

13. The system of claim 12, wherein a DC inverter is affixed to and conductively coupled to a bottom side of the AC solar cell or is incorporated into the solar cell.

14. The system of claim 13, wherein the electrical terminals located on the least two sides of the modular tile are further designed to mate with a plurality of electrical terminals on a roof guide rail.

15. A modular solar panel roof system comprising a plurality of interconnected square or rectangular shaped modular tiles, each modular tile comprising:

a housing with the outward facing surface designed to support weight without breaking;

a circular opening extending into the outward facing surface;

a circular AC solar cell sized to be received within said circular opening, said AC solar cell having at least one tab adapted to retain said AC solar cell within said circular opening as said AC solar cell is rotated from an insertion orientation to a locked position;

contours located on at least two sides of the modular tile, wherein said contours comprise tongue and groove features extending longitudinally along a length of said at least two sides and are designed to mate with identical contours on an adjacent modular tile, so as to define a water tight seal between said modular tiles; and electrical terminals located on at least two sides of the modular tile, wherein said electrical terminals are conductively coupled with the AC solar cell in said modular tile, and wherein said electrical terminals are designed to mate with identical electrical terminals on an adjacent modular tile and with a plurality of electrical terminals on a roof guide rail.

16. The system of claim 15, wherein the housing has a plurality of boreholes on the top surface, wherein each borehole is positioned above a conductor, which conductor conductively couples the AC solar cell to the electrical terminals, wherein each borehole provides access to said conductor, wherein a rubber plug seals each borehole, and wherein each plug is removable such that a user can test each conductor.

17. The system of claim 16, wherein a DC inverter is conductively coupled to the system.

18. The system of claim 15, wherein the top surface comprises plurality of outward facing surfaces comprise material having UV resistant properties.

* * * * *